(12) United States Patent
Li et al.

(10) Patent No.: US 11,568,599 B2
(45) Date of Patent: Jan. 31, 2023

(54) NAVIGATION SYSTEM AND A DISPLAY METHOD OF A NAVIGATION MAP

(71) Applicant: Ford Global Technologies, LLC, Dearborn, MI (US)

(72) Inventors: Yifei Li, Shanghai (CN); Henry Fan, Shanghai (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/237,741

(22) Filed: Apr. 22, 2021

(65) Prior Publication Data
US 2021/0335036 A1 Oct. 28, 2021

(30) Foreign Application Priority Data

Apr. 27, 2020 (CN) .......................... 202010342021.7

(51) Int. Cl.
*G06T 17/05* (2011.01)
*B60K 35/00* (2006.01)
*G01C 21/36* (2006.01)

(52) U.S. Cl.
CPC .............. *G06T 17/05* (2013.01); *B60K 35/00* (2013.01); *B60K 2370/166* (2019.05); *B60K 2370/167* (2019.05); *B60K 2370/178* (2019.05); *B60K 2370/52* (2019.05); *G01C 21/3667* (2013.01); *G06T 2210/61* (2013.01)

(58) Field of Classification Search
None
See application file for complete search history.

(56) References Cited

U.S. PATENT DOCUMENTS

| 6,674,434 | B1 * | 1/2004 | Chojnacki | G01C 21/32 345/428 |
| 10,684,626 | B1 * | 6/2020 | Martin | G06V 20/582 |
| 10,994,712 | B2 * | 5/2021 | Oba | B60W 50/14 |
| 2001/0020211 | A1 * | 9/2001 | Takayama | G01C 21/3626 701/410 |

(Continued)

FOREIGN PATENT DOCUMENTS

| JP | 2005326306 A | 11/2005 |
| JP | 2009169770 A | 7/2009 |

(Continued)

*Primary Examiner* — Jason A Pringle-Parker
(74) *Attorney, Agent, or Firm* — Brandon Hicks; Eversheds Sutherland (US) LLP

(57) ABSTRACT

A navigation system for a motor vehicle is provided. The navigation system comprises: a display interface located in the vehicle and configured to display a position of the vehicle; and a processor in communication with a vehicle sensor and a server and configured to receive vehicle-related information. The processor is configured to display the related information on the display interface in real time following the vehicle position when the related information belongs to a first preset category. A display method of a navigation map is also provided. The navigation system and the display method provided in the present application can help users obtain auxiliary information needed to drive on the current route from the navigation interface more conveniently in the process of using the navigation map, and thus provide a better driving experience to users.

14 Claims, 6 Drawing Sheets

(56) References Cited

U.S. PATENT DOCUMENTS

| | | | | |
|---|---|---|---|---|
| 2001/0026291 | A1* | 10/2001 | Uchida | G01C 21/3611 715/810 |
| 2006/0055565 | A1* | 3/2006 | Kawamata | G08G 1/0962 340/995.13 |
| 2009/0222149 | A1* | 9/2009 | Murray | G05D 1/0033 701/2 |
| 2010/0207787 | A1* | 8/2010 | Catten | G08G 1/0967 16 340/905 |
| 2010/0235034 | A1* | 9/2010 | Higgins | G06F 3/017 701/28 |
| 2014/0074390 | A1* | 3/2014 | Williams | G06F 7/00 701/1 |
| 2014/0372487 | A1* | 12/2014 | Pfeifle | G01C 21/00 707/793 |
| 2016/0167648 | A1* | 6/2016 | James | B60Q 1/503 701/28 |
| 2016/0325753 | A1* | 11/2016 | Stein | B60T 8/172 |
| 2017/0013188 | A1* | 1/2017 | Kothari | B60R 1/00 |
| 2017/0131719 | A1* | 5/2017 | Micks | G06V 20/584 |
| 2018/0050800 | A1* | 2/2018 | Boykin | G10L 25/51 |
| 2018/0211532 | A1* | 7/2018 | Aoki | G08G 1/00 |
| 2018/0224844 | A1* | 8/2018 | Zhang | H04L 67/1097 |
| 2018/0233047 | A1* | 8/2018 | Mandeville-Clarke | B62D 15/0255 |
| 2019/0130736 | A1* | 5/2019 | Silver | G08G 1/0145 |
| 2019/0258253 | A1* | 8/2019 | Tremblay | G05D 1/0088 |
| 2020/0225662 | A1* | 7/2020 | Dev | G05D 1/0253 |
| 2020/0377119 | A1* | 12/2020 | Khlifi | G01S 7/354 |
| 2020/0394393 | A1* | 12/2020 | Kraft | G06V 40/113 |
| 2021/0012100 | A1* | 1/2021 | Hoffmann | G06F 3/017 |
| 2021/0089762 | A1* | 3/2021 | Rahimi | G06V 40/10 |
| 2021/0304617 | A1* | 9/2021 | Ahire | G06V 40/20 |

FOREIGN PATENT DOCUMENTS

| | | |
|---|---|---|
| JP | 4973471 B2 | 7/2012 |
| KR | 20110063728 A | 6/2011 |

* cited by examiner

NAVIGATION SYSTEM AND A DISPLAY METHOD OF A NAVIGATION MAP

CROSS-REFERENCE TO RELATED APPLICATIONS

The present application claims priority to and the benefit of Chinese Application No. 2020103420217, filed Apr. 27, 2020, which is hereby incorporated by reference herein in its entirety.

FIELD

The present application generally relates to vehicle technology field, and more particularly to a navigation system and a display method of a navigation map.

BACKGROUND

Positioning navigation systems have been developed rapidly in the design and manufacture of modern vehicles, and positioning navigation devices have been widely used in various types of vehicles to provide vehicle users with navigation services.

When existing navigation systems display a navigation route, they usually show a real-time road position and show real-time road conditions and route planning to the driver in other areas of a navigation map, or provide the driver with multiple road information in the same display mode at the same time to assist driving. However, in this case, the separate display of vehicle position and road information and the display of multiple road information will cause the driver to be distracted from driving to find the information he needs.

Therefore, there is still a need for improvement in current technology that can better provide drivers with driving assistance information.

SUMMARY

The present application provides a navigation system and a display method of a navigation map which integrates the display of vehicle position and road information and can help users to conveniently obtain necessary information for vehicle driving in the process of using the navigation system, so that they have a safer and better driving experience.

According to the present application, a navigation system is provided, which comprises: a display interface located in a vehicle and configured to display a navigation map and a position of the vehicle; and a processor in communication with a vehicle sensor and a server and configured to receive vehicle-related information. The processor is configured to display the related information on the display interface in real time following the vehicle position when the related information belongs to a first preset category.

According to an embodiment of the present application, the processor is configured to display the related information on the display interface in real time following the vehicle position in a form of a message box.

According to an embodiment of the present application, the processor is configured to update status, quantity, and content of the related information displayed in the message box in real time.

According to an embodiment of the present application, the navigation map comprises at least one of a two-dimensional plane map, a three-dimensional map, a real-world map, and a virtual reality map, and the vehicle position is displayed on the navigation map in a form of an icon or a virtual vehicle and the message box floats around the vehicle position.

According to an embodiment of the present application, the processor is further configured to selectively display the related information in the message box according to a priority of the related information and/or user customization.

According to an embodiment of the present application, the information that belongs to the first preset category includes vehicle information and/or road information, the vehicle information at least includes one or more of safety reminders, fault reminders, speed information, acceleration information, steering operation, braking operation, the vehicle position, lane confirmation, navigation information, and driving logs, and the road information at least includes one or more of traffic signs, traffic signals, and road features.

According to an embodiment of the present application, the processor is further configured to predict a traveling direction of the vehicle based on the vehicle information and highlight the road information associated with the traveling direction of the vehicle in the message box, and the highlighting refers to displaying the road information associated with the traveling direction on the display interface individually or performing one or more of the following operations on the road information associated with the traveling direction on the display interface: changing size, adjusting colour, and adjusting contrast.

According to an embodiment of the present application, when the navigation map is operated in a navigation mode, the prediction is made based on the vehicle position and the navigation information, and one or more of the traffic signs, the traffic signals, and the road features associated with the traveling direction are highlighted in the message box.

According to an embodiment of the present application, when the navigation map is operated in a cruise mode, the prediction is made based on the vehicle position and the lane confirmation or based on the vehicle position and the steering operation and/or the driving logs, and one or more of the traffic signs, the traffic signals, and the road features associated with the traveling direction are highlighted on the display interface.

According to an embodiment of the present application, the related information displayed in the message box can be manually corrected by a driver.

According to an embodiment of the present application, the navigation system is a vehicle navigation system.

According to another aspect of the present application, a display method of a navigation map is provided, which comprises: displaying the navigation map and a position of a vehicle; receiving vehicle-related information; and displaying the related information in real time following the vehicle position when the related information belongs to a first preset category.

According to an embodiment of the present application, displaying the related information following the vehicle position comprises displaying the related information in real time following the vehicle position in a form of a message box.

According to an embodiment of the present application, the information that belongs to the first preset category is customizable by a user.

According to an embodiment of the present application, the navigation map comprises at least one of a two-dimensional plane map, a three-dimensional map, a real-world map, and a virtual reality map, and the vehicle position is displayed on the navigation map in a form of an icon or a virtual vehicle and the message box floats around the vehicle position.

According to an embodiment of the present application, the display method further comprises selectively displaying the related information in the message box according to a priority of the related information and/or user customization.

According to an embodiment of the present application, the information that belongs to the first preset category includes vehicle information and/or road information, the vehicle information at least includes one or more of safety reminders, fault reminders, speed information, acceleration information, steering operation, braking operation, the vehicle position, lane confirmation, navigation information, and driving logs, and the road information at least includes one or more of traffic signs, traffic signals, and road features.

According to an embodiment of the present application, the display method further comprises predicting a traveling direction of the vehicle based on the vehicle information and highlighting the road information associated with the traveling direction of the vehicle in the message box, and the highlighting refers to displaying the road information associated with the traveling direction on the display interface individually or performing one or more of the following operations on the road information associated with the traveling direction on the display interface: changing size or adjusting colour, and adjusting contrast.

According to an embodiment of the present application, when the navigation map is operated in a navigation mode, the prediction is made based on the vehicle position and the navigation information, and one or more of the traffic signs, the traffic signals, and the road features associated with the traveling direction are highlighted in the message box.

According to an embodiment of the present application, when the navigation map is operated in a cruise mode, the prediction is made based on the vehicle position and the lane confirmation or based on the vehicle position and the steering operation and/or the driving logs, and one or more of the traffic signs, the traffic signals, and the road features associated with the traveling direction are highlighted on the display interface.

BRIEF DESCRIPTION OF THE DRAWINGS

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like referenced numerals refer to like parts throughout the different figures.

DETAILED DESCRIPTION

Figure 1:
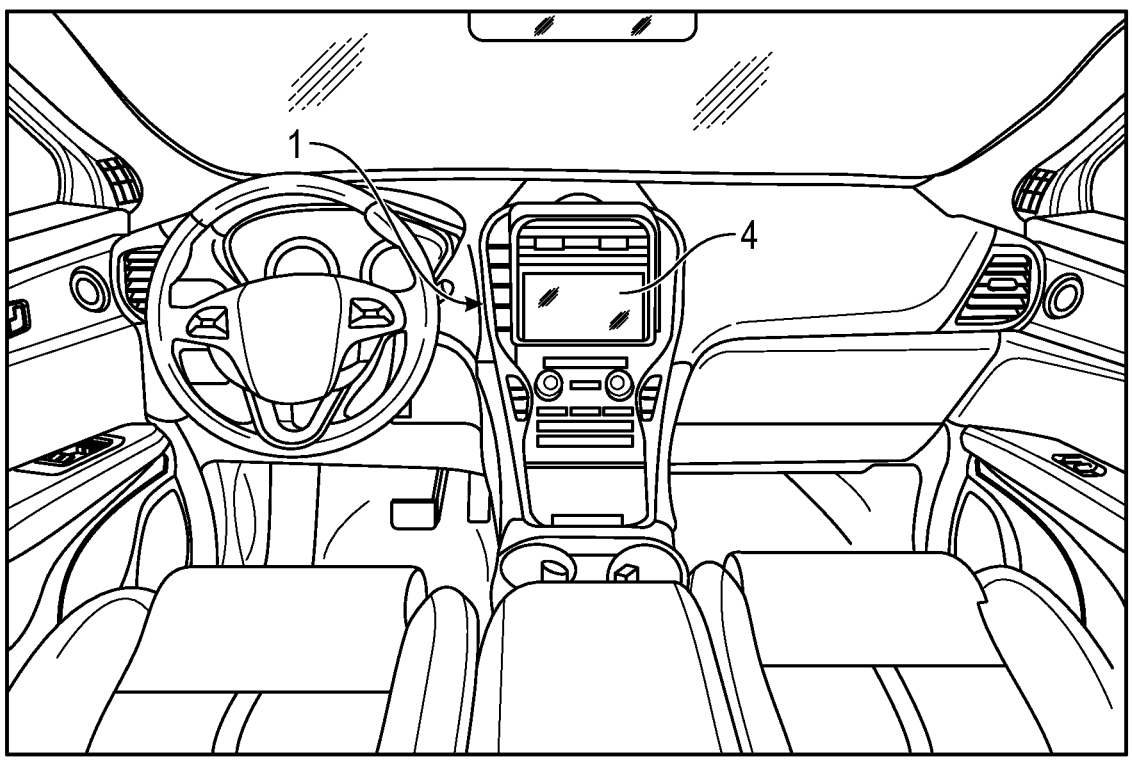
FIG. 1 shows a cabin of a motor vehicle comprising a navigation system according to the present application.

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

As mentioned in the background above, due to the excessive amount of information provided and the provision of the vehicle position information and the road information in different areas, drivers usually needs to pay extra attention to these information, so that drivers may not be able to focus on driving behaviour, thus resulting in a reduction in the vehicle driving safety. However, in the current solutions, how to provide the vehicle position information and the road information that assist the drivers to drive in the same display area and how to better understand the vehicle drivers' intentions and thereby present relevant road information to them have not been taken seriously, thus making drivers or vehicle occupants feel unsmooth when they need to use these information. As a result, the inventors realizes that there is a lack of a navigation system and method that displays the vehicle position information and the road information for assisting driving in an integrated manner and determines the driver's driving intention in real time by gathering the vehicle information and the road information to provide the drivers with the road information he needs. Based on one or more problems in the prior art, the inventors realizes that there is a need for an improved navigation system and display method that can help users to obtain both the vehicle position information and auxiliary information needed to drive on current route from the display interface of the navigation system to provide users with a better navigation experience while using the navigation system. The present application provides a navigation system and a display method of the navigation system in one or more embodiments which is believed to solve the one or more problems in the prior art.

One or more embodiments of the present application will be described below in conjunction with the drawings. The flowchart describes the process performed by the system. It can be understood that the execution of the flowchart does not need to be performed in sequence, one or more steps can be omitted, one or more steps can also be added, and one or more steps can be performed in order or in reverse order, and even in some embodiments, can be performed simultaneously.

The terms "driver", "occupant", "passenger" and "other clients of a same user" and so on involved in the following embodiments are used to illustrate the interaction between vehicle and user in one or more embodiments, and in some cases, the roles can be exchanged or other names can be used without departing from the spirit of the present application.

The motor vehicle involved in the following embodiments may be a standard gasoline powered vehicle, a hybrid vehicle, an electric vehicle, a fuel cell vehicle, and/or any other types of vehicle, and may also be a bus, a ship, or an aircraft. The vehicle includes components related to mobility, such as engines, electric motors, transmissions, suspensions, drive shafts, and/or wheels. The vehicle can be non-autonomous, semi-autonomous (for example, some conventional motion functions are controlled by the vehicle) or autonomous (for example, the motion functions are controlled by the vehicle without direct input from the driver).

FIG. 1 shows a cabin of a motor vehicle according to the present disclosure. The motor vehicle comprises an in-vehicle management system 1. The in-vehicle management system 1 comprises a navigation system according to the present application. According to an aspect of the present application, the provided navigation system may comprise: a display interface 40 located in the vehicle and configured to display a position of the vehicle; and a processor in communication with a vehicle sensor and a server and configured to receive vehicle-related information. The processor is configured to display the related information on the display interface 40 in real time following the vehicle position when the related information belongs to a first preset category. It can be understood that, the "navigation system" in the present application can show a navigation mode, in which a navigation service is provided to a driver, or a cruise mode, in which the vehicle information and relevant road information are shown to the driver, on a display interface of a display 4, and can also show the vehicle information or road information associated with the vehicle traveling in the form of a pop-up information window when the display 4 shows other applications or setting interfaces.

The display 4 can include the above display interface 40. It is also understood that the display interface 40 can also be a display interface of other smart devices that are not in-vehicle. As further shown in the exemplary block topology of the in-vehicle management system 1 in FIG. 2, the in-vehicle management system 1 includes a processor 3 and a memory 7 storing processor-executable instructions which implement the steps shown in FIG. 3 when executed by the processor 3.

Figure 2:
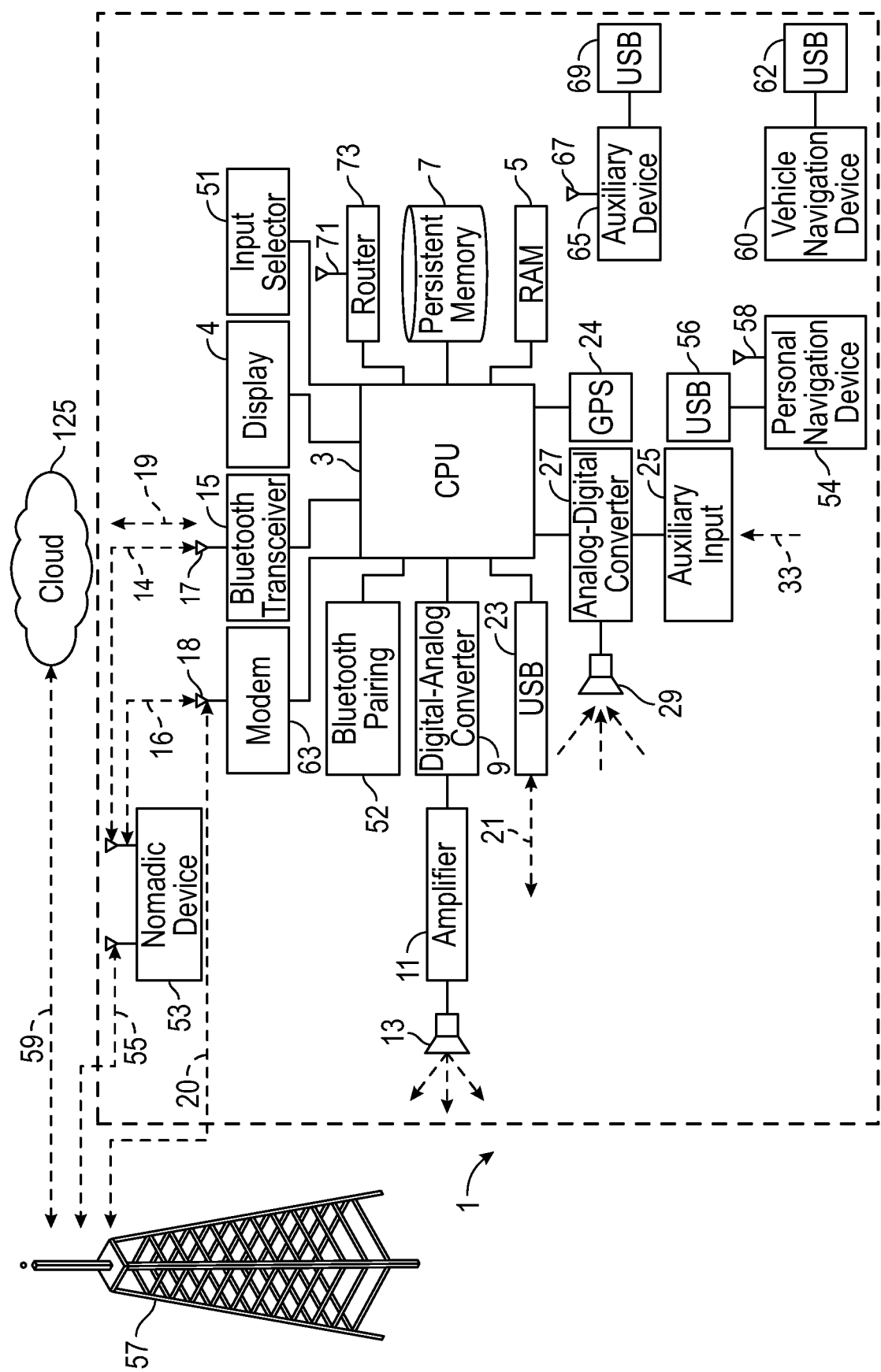
FIG. 2 shows an exemplary block topology of an in-vehicle management system according to the present application.

Next, an exemplary hardware environment of the in-vehicle management system (also called a vehicle computing system (VCS)) 1 for the vehicle will be described in conjunction with FIG. 2. An example of an operating system installed in the in-vehicle management system 1 is SYNC system manufactured by Ford Motor Company. the vehicle equipped with the in-vehicle management system 1 may include a display 4 located in the vehicle, such as the display shown in FIG. 1. The display 4 can be used to display the navigation interface of the navigation system. The number of the display 4 may be one or more so as to present individually or in conjunction vehicle information or content that interacts with the vehicle—for example, the display of information related to vehicle and vehicle driving, and the display and interaction of various applications installed in the in-vehicle management system. For example, but not limited, types of display may include CRT (Cathode Ray Tube) displays, LCD (Liquid Crystal) displays, LED (Light Emitting Diode) displays, PDP (Plasma Displays), laser displays, VR (Virtual Reality) displays, and HUD (Head Up/Head-up) display. It can be understood the display can be located in any suitable position in the vehicle, such as but not limited to a centre console, or virtually projected onto a side window, a windshield or other suitable background.

The processor (CPU) 3 of the in-vehicle management system 1 controls at least a part of its own operation. The processor 3 can execute on-board processing instructions and programs, such as the processor-executable instructions described for the in-vehicle management system 1 in the present disclosure. The processor 3 is connected to a non-persistent memory 5 and a persistent memory 7. The memories 5 and 7 may include volatile and non-volatile memories such as Read Only Memory (ROM), Random Access Memory (RAM) and Keep-Alive Memory (KAM), etc. Any number of known storage devices (such as Programmable Read Only Memory (PROM), EPROM (Electrically Programmable Read-only Memory), EEPROM (Electrically Erasable Programmable Read Only Memory), flash memory or any other electronic, magnetic, optical or combined storage devices capable of storing data) can be used to implement the memories 5 and 7. The memories 5 and 7 may store instructions for execution by, for example, the processor of the in-vehicle management system 1.

The processor 3 is also provided with multiple different inputs to allow the user to interact with the processor. In an illustrative embodiment, the inputs include a microphone 29 configured to receive voice signals, an auxiliary input 25 for the input 33 (eg CD (Compact Disc), tape, etc.), a USB (Universal Serial Bus) input 23, a GPS (Global Positioning System) input 24, and a Bluetooth input 15. An input selector 51 is also provided to allow the user to switch among various inputs. The input at the microphone and auxiliary connector can be converted from an analog signal to a digital signal by a converter 27 before being passed to the processor. In addition, although not shown, a plurality of vehicle components and auxiliary components that communicate with the in-vehicle management system may use a vehicle network (such as but not limited to CAN (Controller Area Network) bus) to transfer/receive data to/from the in-vehicle management system 1 (or its components).

Additionally, the processor 3 may communicate with multiple vehicle sensors and drivers via an input/output (I/O) interface. The I/O interface may be implemented as single integrated interface that provides multiple raw data or signal adjustment, processing and/or conversion, short-circuit protection, etc. Further, by way of example, but not limited, types of the sensors that communicate with the processor 3 may include cameras, ultrasonic sensors, pressure sensors, fuel level sensors, engine speed sensors, temperature sensors, photoplethysmography sensors, etc, to identify user interaction information such as button presses, voice, touch, text input, facial expressions or actions, hand gestures or actions, head gestures or actions, and body gestures or actions, as well as to identify vehicle information such as fuel level, powertrain system failure, temperature inside the vehicle, etc.

The output of the in-vehicle management system 1 may include, but is not limited to, the display 4, the speaker 13, and various actuators. The speaker 13 may be connected to an amplifier 11 and receive signal from the processor 3 through a digital-analog converter 9. The output of the system can also be output to a remote Bluetooth device (such as a personal navigation device 54) or a USB device (such as a vehicle navigation device 60) along bidirectional data streams indicated by 19 and 21, respectively.

In an illustrative embodiment, the in-vehicle management system 1 uses an antenna 17 of a Bluetooth transceiver 15 to communicate with a nomadic device 53 (eg, cellular phone, smart phone, personal digital assistant, etc.) of the user. The nomadic device 53 may in turn communicate 59 with the cloud 125 outside the vehicle 31 through, for example, a communication 55 with a cellular tower 57. In some embodiments, the cellular tower 57 may be a Wi-Fi (Wireless Local Area Network) access point. Signal 14 represents an exemplary communication between the nomadic device 53 and the Bluetooth transceiver 15. The pairing 52 of the nomadic device 53 and the Bluetooth transceiver 15 can be instructed through a button or similar input, thereby the processor 3 is indicated that the in-vehicle Bluetooth transceiver will be paired with the Bluetooth transceiver in the nomadic device.

For example, data-plan, data over voice, or Dual-Tone Multi-Frequency (DTMF) tones associated with the nomadic device 53 can be used to transfer data between the processor 3 and the cloud 125. Alternatively, the in-vehicle management system 1 may include an in-vehicle modem 63 having an antenna 18, with which data is transferred 16 between the processor 3 and the nomadic device 53 via a voice band. Subsequently, the nomadic device 53 can communicate 59 with the cloud 125 outside the vehicle 31 through, for example, a communication 55 with the cellular tower 57. In some embodiments, the modem 63 may directly establish a communication 20 with the cellular tower for further communication with the cloud 125. As a non-limiting example, the modem 63 may be a USB cellular modem and the communication 20 may be cellular communication.

In an illustrative embodiment, the processor is provided with an operating system including an API (Application Programming Interface) that communicates with modem application software. The modem application software may access an embedded module or firmware on the Bluetooth transceiver 15 to complete a wireless communication with a remote Bluetooth transceiver (for example, a Bluetooth transceiver in the nomadic device). The Bluetooth is a subset of an IEEE 802 PANS (Personal Area Networks) protocol. An IEEE 802 LAN (Local Area Network) protocol includes Wi-Fi and has a lot of cross-functionality with IEEE 802 PAN. Both of them are suitable for wireless communication in vehicles. Other communication methods can include free-space optical communication (for example, Infrared Data Association, IrDA) and non-standard consumer infrared (consumer IR) protocols, and so on.

In an embodiment, the nomadic device 53 may be a wireless Local Area Network (LAN) device capable of communicating via, for example, an 802.11 network (for example, Wi-Fi) or a WiMax (Worldwide Interoperability Microwave Access) network. Other sources that can interact with the vehicle include a personal navigation device 54 with, for example, a USB connection 56 and/or antenna 58, or a vehicle navigation device 60 with a USB 62 or other connection, an on-board GPS device 24, or a remote navigation system (not shown) connected to the cloud 125.

In addition, the processor 3 can communicate with a number of other auxiliary devices 65. These devices can be connected via a wireless connection 67 or a wired connection 69. Likewise or alternatively, the CPU may connect to a vehicle-based wireless router 73 via, for example, a Wi-Fi 71 transceiver. This may allow the CPU to connect to a remote network within the range of the local router 73. The auxiliary device 65 may include, but is not limited to, a personal media player, a wireless health device, a mobile computer, and so on.

Figure 3:
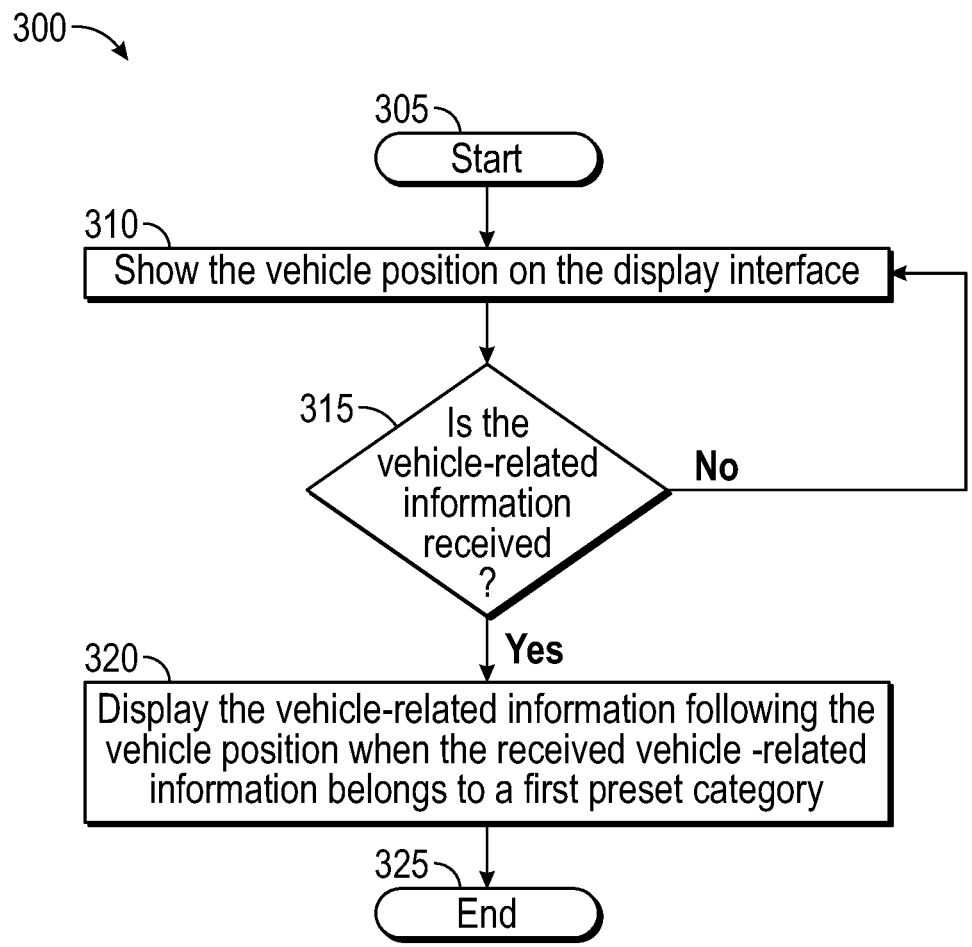
FIG. 3 shows a flowchart of a display method of a navigation map according to the present application.

In an embodiment, the flowchart of the display method of the navigation system according to the present application is shown in FIG. 3, which shows a flowchart 300 of display method of a navigation map.

In the flowchart 300, when the vehicle driver or occupant turns on the vehicle navigation device, the navigation method according to the present application starts at block 305. Next, the navigation system displays the navigation interface on the display 4 of the vehicle and displays a position of the vehicle. It can be understood that, in one or more embodiments, the navigation map may include at least one of a two-dimensional plane map, a three-dimensional map, a real map, and a virtual reality map, and the vehicle position is displayed on the navigation map in the form of an icon or a virtual vehicle. A message box may float around the vehicle position to display part of the selected information collectively on the navigation interface. For example, the message box can display dashboard information of the vehicle in an integrated manner For example, the dashboard information may include some of the following: speed, rotation speed, mileage, gear, water temperature, various fault indicators, other safety reminders, and fault information displays. The display of this information can well enable the driver to obtain auxiliary information for operating the vehicle from this interface without being distracted by other display devices, such as dashboards. It can be understood that other information that has auxiliary functions for the driver to operate the vehicle can also be displayed on the display interface.

Then, in block 315, the in-vehicle management system 1 continually monitors whether vehicle-related information is received and whether the related information belongs to a first preset category. The vehicle-related information that belongs to the first preset category includes vehicle information and/or road information. The first preset category may be preset according to requirements. For example, information related to safety, affecting driving decisions, affecting navigation routes, etc. can be classified into the first preset category. The vehicle information may include safety reminders, fault reminders, speed information, acceleration information, steering operation, braking operation, the vehicle position, lane confirmation, navigation information, and driving logs. The road information may include traffic signs, traffic signals, road features and road related information. The traffic signs on the road include but not limited to one or more of warning signs, prohibition signs, indication signs, guide signs, tourist area signs and road construction safety signs and so on. The traffic signals include but not limited to traffic lights and gestures of traffic polices. The road features include but not limited to length, width, grade, roughness of the road and obstacles on the road. The road related information include but not limited to real-time traffic information, road weather information, accident section information, road monitoring point information as well as information of surrounding vehicles of this vehicle.

The vehicle may use various sensors and vehicle modules that are in communication with the processor 3 of the in-vehicle management system 1—for example an engine speed sensor, a navigation module, a brake sensor, and a memory and so on—to obtain above vehicle information, and may also gather the relevant information on the driving route of the vehicle via sensors that are in communication with the processor 3—such as a camera, an ultrasonic sensor, a temperature sensor, a photoelectric volumetric pulse wave sensor and so on. The vehicle can also communicate with the nomadic device 53 of the vehicle user via the onboard antenna 17, and then communicate with the cloud 125 to obtain the relevant information on the driving route of this vehicle from the cloud 125. It can be understood that other ways for obtaining the road information likewise can be used in the present application and fall within the scope of technical contents claimed by the present application.

Once the processor 3 of the in-vehicle management system 1 receives vehicle-related information such as vehicle information and road information, the flow proceeds to block 320. If the vehicle-related information is not received, the flow returns to block 310 to continue to show a current vehicle position on the navigation interface and continue to detect. In block 320, combined with FIG. 4, the processor 3 displays the vehicle-related information on the display interface 40 in real time following the indicator 41 of the vehicle position in a form of a bubble-shaped message box 42 according to the received vehicle-related information including the vehicle information and/or the road information. The following will take traffic information as an example for description. It should be understood that the vehicle-related information includes the Information about the vehicle itself or road-related information described above. In this specific embodiment, it can be seen that the message box 42 displays the information of the traffic lights at the intersection that is about to arrive. It can be understood that the message box 42 can take various shapes, and the size of the message box 42 can be automatically adjusted according to the content of the information displayed.

In one or more embodiments, the related information may be selectively displayed in the message box according to a priority of the related information and/or user customization. In an embodiment, for example, the safety information is set to have a first priority according to needs, that is, information such as obstacles, traffic lights, fault reminders, etc., can be considered as related information that needs to be highlighted. In another embodiment, relevant range, display time, etc. of the related information can be customized by the user, and can also be changed in real time according to the status of the message itself or can also be adjusted according to user needs. When the displayed message box contains too much content, the size of the message box can be limited to a size that does not affect the observation of the navigation route, and the information items in the message box can be arranged according to the priority or according to user selection. For example, the processor can be configured to update status, quantity, and content of the related information displayed in the message box in real time. In another embodiment, in block 320, the processor 3 may predict a traveling direction of the vehicle according to the received vehicle information—for example the vehicle turns to the left, turns to the right or goes straight at the upcoming intersection, then analyse the received road information based on the prediction and highlight the road information associated with the traveling direction of the vehicle in the message box 42, thereby enabling the driver to conveniently obtain the road information he needs on the display area indicating the vehicle position. The processor 3 may predict the traveling direction of the vehicle according to the above various types of the vehicle information to determine the road information associated with the traveling direction. In an embodiment, in the navigation mode, the processor 3 may determine the traveling direction of the vehicle according to the navigation information before this vehicle arriving at the intersection ahead, and highlight the road information associated with the traveling direction which includes the status of traffic lights, and information such as lane closures or lane obstacles.

In an embodiment, in the cruise mode, the processor 3 can also predict steering intention of the driver at the upcoming intersection according to the current position of the vehicle and the steering operation of the driver—for example switching on a turn light on one side or turning the steering wheel to one side and so on, and thereby highlight the road information associated with the traveling direction. In an embodiment, the processor 3 can also predict a traveling direction intention of the driver at the upcoming intersection according to the current position of the vehicle and the lane confirmation information confirmed by the vehicle sensor to the lane at which the vehicle is located—for example information indicating that the vehicle is in a left-turning lane, a right-turning lane or a straight lane when approaching the intersection, and thereby highlight the road information associated with the traveling direction. In another embodiment, in the cruise mode, the processor 3 can predict a possible traveling direction of the vehicle at the upcoming intersection according to the current position of the vehicle and driving logs of the vehicle stored in the memory of the in-vehicle management system 1—for example this vehicle has a relatively fixed driving route in the corresponding time period of the workday, and thereby highlight the road information associated with the traveling direction. It can be understood that the above is only an exemplary explanation for the processor 3 to determine the traveling direction of the vehicle, other methods for determining the traveling route and traveling direction of the vehicle can also be applied to the technical solution according to the present application and are included within the scope defined by the technical solution according to the present application. Then, one loop of the display method of the navigation map according to the present application is ended in block 325. It can be seen from the flowchart of the above-mentioned navigation method that the vehicle position can be well integrated with other driving-assisting vehicle information or road information for display by the message box 42 that displays the vehicle information and/or the road information on the navigation interface 40 in real time following the indicator 41 of the vehicle position, and thus the driver is prevented from being distracted from driving by searching for and determining the vehicle position information and the road information in different areas of the display interface 40.

Figure 4:
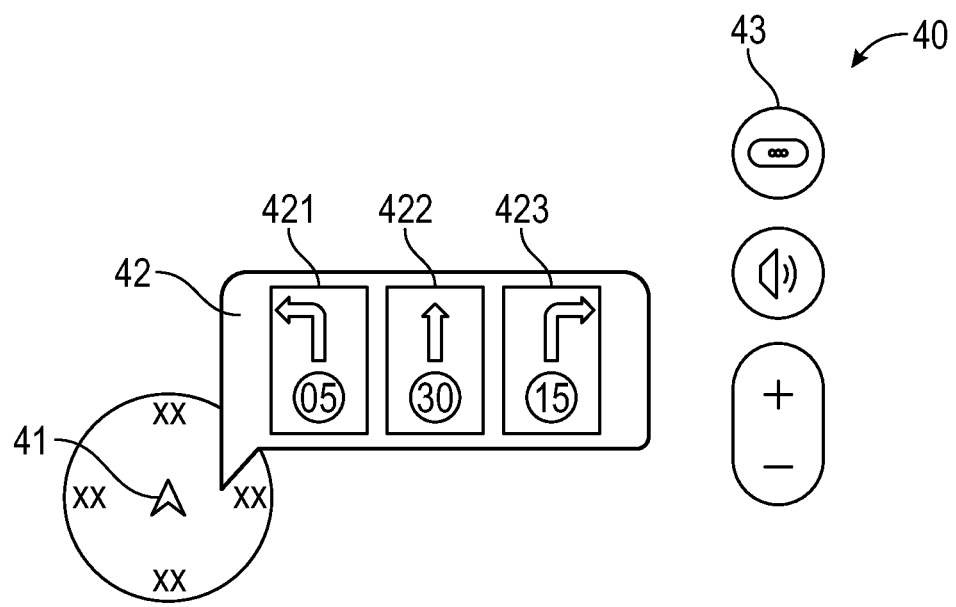
FIG. 4 shows a schematic diagram of an embodiment of a display interface of the navigation map according to the present application.

In an embodiment of the display interface of the navigation system according to the present application as shown in FIG. 4, it can be seen that the display interface 40 of the navigation system displays the real-time position of the vehicle in the form of a indicator 41, and displays the vehicle information or the road information in a bubble-shaped message box 42 that follows the indicator 41 of the real-time position of the vehicle. In this embodiment, the message box 42 displays the information of the traffic lights at the intersection that is about to arrive. It can be understood that other vehicle information or road information can also be displayed through the bubble-shaped message box 42. For example, during the cruising of vehicle, vehicle speed information, speeding warning information, lane confirmation information, merging assistance information, traffic accident information on the road ahead, other vehicle information, and other road information associated with the traveling direction of the vehicle can be displayed through the message box 42. The display interface 40 also includes a display area 43, which includes, but is not limited to, a switch button for real-time road conditions, a mute button for navigation voice, and a zoom-in/out button in the navigation interface. In this embodiment, the message box 42 exemplarily includes three display areas, namely, a display area 421, a display area 422, and a display area 423. It can be understood that redistricting display areas according to the need of the display content is likewise included within the scope defined by the technical solution according to the present application. For example, when the processor 3 predicts that the driver will go straight at the intersection ahead, in addition to highlighting the information shown in the display area 422, the area of the display area 422 in the message box 42 can be enlarged and areas of the display area 421 and 423 can be shrunk correspondingly. Real-time statuses of the traffic lights at the intersection ahead are shown respectively in the three display areas. A text box 42 following the indicator 41 of the vehicle position can be set to pop up within a predetermined distance or within a predetermined time range before the vehicle arrives at the intersection ahead, and the real-time status of the traffic lights can be shown in each display area of the text box 42. Of course, it can be understood that the text box 42 can also display the vehicle information and/or road information at any time following the indicator 41 of the vehicle position according to the driver's setting without being hidden from the display interface 40.

Figure 5:
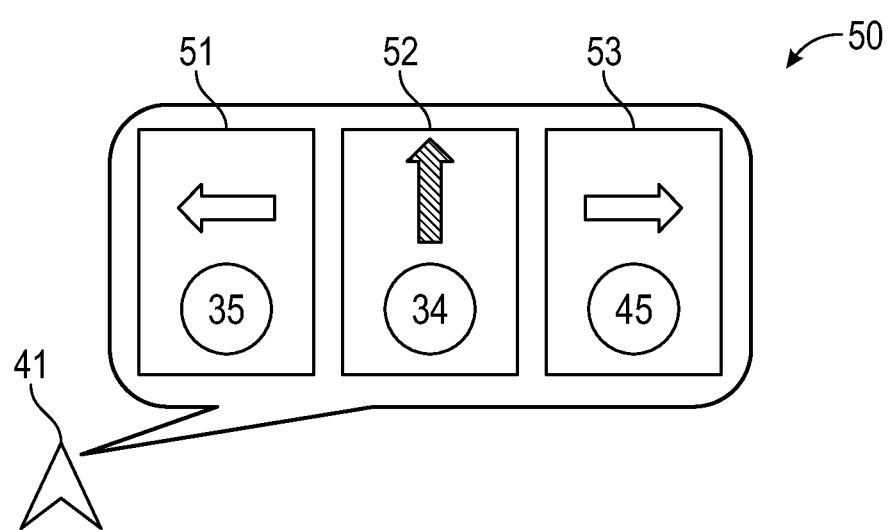
FIG. 5 shows a schematic diagram of an embodiment of a display interface of the navigation map according to the present application with a message box highlighted.

Next, with reference to FIG. 5, an embodiment of the display interface of the navigation map according to the present application with the message box highlighted is described. It can be seen from FIG. 5 that a text box 50 follows the movement of the indicator 41 of the vehicle position in real time with the arrow on the lower left side. Before arriving at the intersection ahead, the display area 51 in the text box 50 shows that the current state of the left turn is passable, the passable status herein can be shown by a green arrow, and the remaining passable time is 35 seconds. The display area 52 shows that a current status of the straight direction is impassable, the impassable status herein can be shown by a red arrow, and the remaining waiting time is 34 seconds. While the display area 53 shows that a current status of the right turn is passable, the passable status can also be shown by a green arrow, and the remaining passable time is 45 seconds. It can be understood that, at an intersection where right turns are not regulated, time is no longer indicated below the right turn passable status herein, and instead the direction that has been in the passable status is indicated merely by the green arrow. It can be understood that, a time display in the display area can be hidden in the last few seconds—for example the last 3 seconds, enabling the driver to focus on the traffic lights instead of the display areas when the traffic lights change to avoid the possibility that a possible delayed display of the road information causes the driver violate the indications of the traffic lights. In addition, it can be understood that above-mentioned display ways are merely exemplary and are not intended to limit the protection scope of the technical solution according to the present application. Furthermore, although it is not shown in the drawings, it can be understood that the traffic signs likewise can be shown in a corresponding display area of the above-mentioned display interface 40 according to the prediction of the driver's intention, such as a speed limit sign, a warning sign to prohibit left turn at the intersection ahead and a warning sign to slow down at the intersection and so on associated with the predicted traveling direction.

Next in combination with embodiments shown in FIG. 4 and FIG. 5, when the vehicle is in the cruise mode, the message box 50 shows the information of the traffic lights of the intersection ahead following the indicator 41 of the vehicle position within a predetermined distance or within a predetermined time when the vehicle arrives at the intersection ahead. As the vehicle continues to drive closer to the intersection ahead, the processor 3 predicts the possible traveling direction of this vehicle according to the received vehicle information, for example predicting the traveling direction of the vehicle based on whether the driver performs a steering operation, driving logs of the vehicle and other vehicle information. When it is predicted that the vehicle will go straight at the intersection ahead, the message box 50 converts to a message box 60. The message box 60 likewise comprises three display areas, which are a display area 61, a display area 62 and a display area 63 respectively. Wherein, according to the predicted straight direction of the vehicle at the intersection ahead, the display area 62 that shows the information of the straight direction amplifies the shown information associated with the straight direction, so that the driver can view the amplified road information. Furthermore, since in the cruise mode, the traveling direction is the predicted traveling direction namely, that is to say, possibilities that the driver drives towards other directions can't be completely ruled out, the relevant road information of the left turn and right turn are also respectively shown at normal size in the display area 61 and display area 62 simultaneously. If the driver expects to amplify the display contents of the other two areas, he can operate a keystroke or roller wheel on the steering wheel or can issue a voice command, and the processor 3 amplifies the road information selected by the driver on the navigation system after receiving relevant command.

Figure 6:
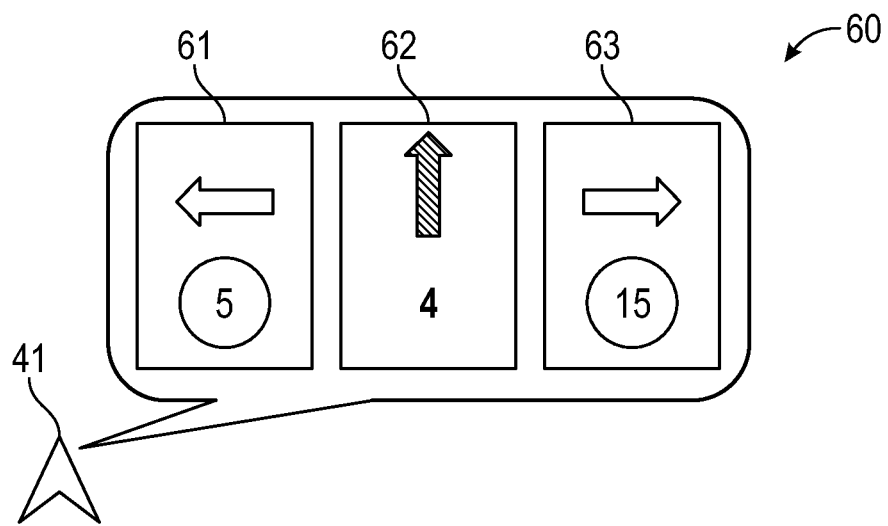
FIG. 6 shows a schematic diagram of an embodiment of a display interface of the navigation map according to the present application with a message box highlighted.
Figure 7:
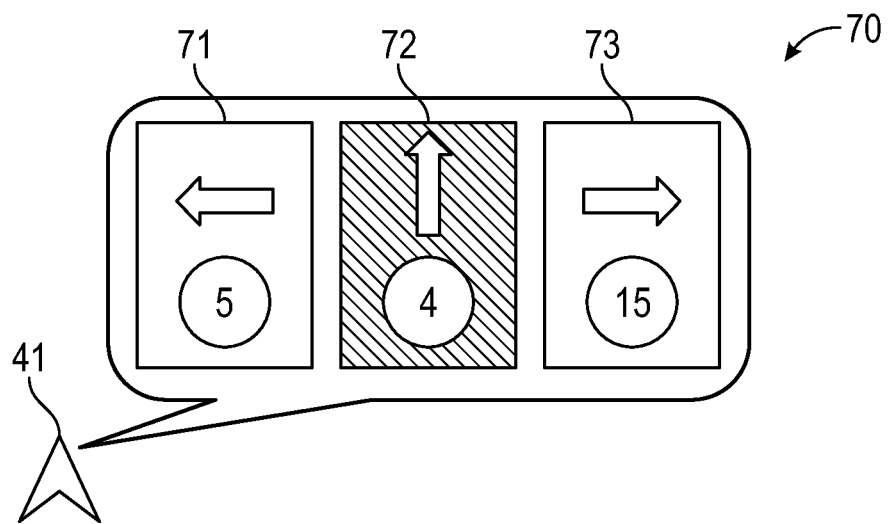
FIG. 7 shows a schematic diagram of an embodiment of a display interface of the navigation map according to the present application with a message box highlighted.

In addition to the highlight way of amplifying the road information in the display area 72 of the message box 60 as shown in FIG. 6, it is also possible to change a base colour or a brightness of the base colour of the display area 72 in the message box 70 following the indicator 41 of the vehicle position as shown in FIG. 7. The road information displayed in the display area 72 is more striking by forming a clear contrast or colour contrast with the road information displayed in the display area 72. And a more obvious visual difference can be formed between the display area 62 and the display area 61 as well as the display area 63 by adjusting the base colour or the brightness of the base colour of the display area 62, so that the driver can also easily look over during the process of driving.

Figure 8:
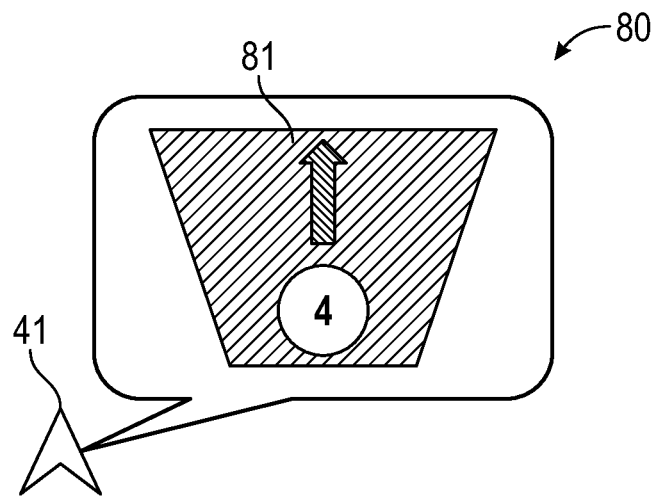
FIG. 8 shows a schematic diagram of an embodiment of a display interface of the navigation map according to the present application with a message box highlighted.
Figure 9:
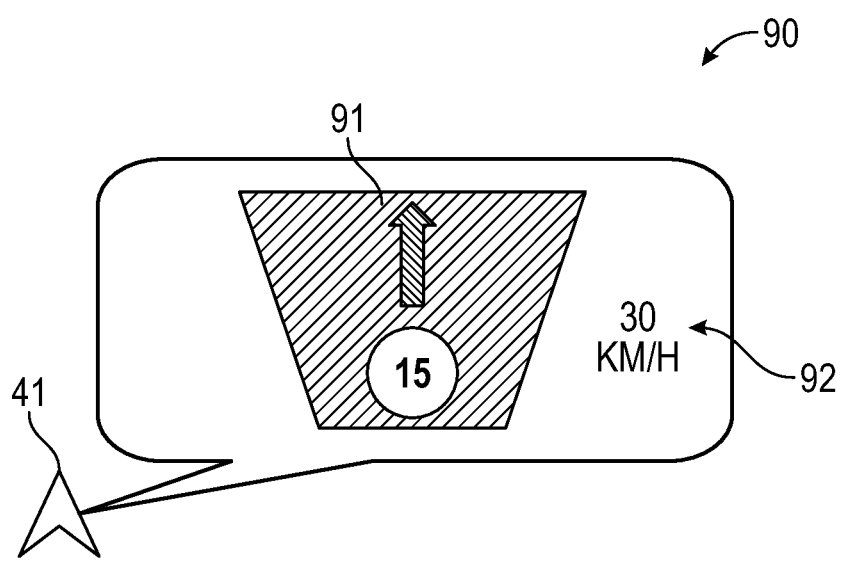
FIG. 9 shows a schematic diagram of an embodiment of a display interface of the navigation map according to the present application with a message box highlighted.

When the vehicle is in the navigation mode, the processor 3 can accurately determine the traveling direction of the vehicle based on the navigation data, and thereby provide a definite road information indication to the driver. In an embodiment of the present application as shown in FIG. 8, when the vehicle is in the navigation mode, only a waiting time in the straight direction is shown in a display area 81 of the message box 80, before the vehicle arriving at the intersection ahead. When the traffic light in the straight direction is red, a red arrow can be used to indicate that the straight direction is impassable for a while and the waiting time is shown in digital below the arrow, meanwhile the base colour of the road profile of the display area 81 can be displayed by a lighter red than the red arrow to indicate that the road ahead in the current straight direction is impassable, and the base colour can be flashed to remind the driver to pay attention. It can be understood that, when the road ahead is passable, the passable direction is shown by a green arrow, the base colour of the road profile of the display area 81 likewise can be displayed by a lighter green than the green arrow to indicate that the road ahead in the straight direction is passable, and the base colour can be flashed to make it easier for the driver to notice the passable indication. It can be seen that, in this embodiment, the size of the message box 80 is adaptively adjusted according to the content to be displayed in the display area 81, so as to make the display of information more clear and eye-catching.

In an embodiment of the present application shown in FIG. 8, in the navigation mode, in addition to displaying the passing status and the waiting time in the straight direction at a display area 91, a current suggested vehicle speed can also be displayed at a display area 92. The suggested vehicle speed is calculated according to an obtained current vehicle speed as well as a distance between the vehicle and the intersection by the processor 3 and is shown on the display area 92 in real-time. In an embodiment, if the current vehicle speed exceeds the suggested vehicle speed, the suggested vehicle speed is shown in red or flashing red to provide the driver a warning, and the colour of the suggested vehicle speed changes to green and stop flashing when the current vehicle speed is within the range of the suggested vehicle speed. It can be understood that the suggested vehicle speed can also be shown in other ways that are capable of giving a warning to the driver, but not only limited to the ways described in above-mentioned embodiments.

When the vehicle is waiting at the intersection, in response to the waiting time being within a preset threshold range, such as 20 seconds or a shorter time in an embodiment, the processor 3 gives instructions to automatically turn off automatic start/stop functions of the vehicle engine or prompt the driver to turn off the automatic start/stop functions of the vehicle engine manually on the display interface of the navigation system to avoid the frequent stops and starts of the engine.

Furthermore, in another example of the present application, there is provided a solution to an indication signal conflict. First it can be understood that gestures of traffic polices belong to the road information of the present application in the case of the gestures can be identified by a vehicle sensor namely. That is to say, the identifiable gestures of the traffic polices is a kind of the traffic signal. When the current road segment is under temporary traffic control or signal light of which fault, once the sensors of the vehicle detects that a status shown by the signal light at the intersection ahead is different from the identified information conveyed by the gestures of the traffic polices, the processor 3 retrieves the preset priority information from the profile stored in the memory to determine the information with higher priority among the detected conflict information, for example, the gestures of the traffic polices have a higher priority than the signal light, in this case, the processor 3 retrieves the corresponding relation between the gestures of the traffic polices and the traffic indication information and shows the indication information conveyed by the gestures of the traffic polices on the display interface of the navigation system. By the above-mentioned way, the driver can avoid the situation of violating traffic laws due to following the wrong instructions. Furthermore, the processor 3, after acquiring the gestures of the traffic polices, converts it into more easily understandable instruction information and displays it to provide more convenient guidance to the driver.

Where it is technically possible, the technical features listed in relation to different embodiments can be combined with each other to form further embodiment within the scope of the present disclosure.

In the present application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present invention and are given only for the purpose of enabling those skilled in the art to clearly understand the principles of the invention. It should be understood by those skilled in the art that the above discussion to any embodiment is only illustrative, and is not intended to imply that the disclosed scope of the embodiments of the present invention (including claims) is limited to these examples; under the overall concept of the invention, the technical features in the above embodiments or different embodiments can be combined with each other to produce many other changes in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

The invention claimed is:

1. A navigation system comprising:
    a display interface located in a vehicle and configured to display a navigation map and a position of the vehicle; and
    a processor in communication with a vehicle sensor and a server and configured to receive vehicle-related information, wherein the processor is configured to display the related information on the display interface in real time following the vehicle position when the related information belongs to a first preset category,
    wherein the processor is configured to display the related information on the display interface in real time following the vehicle position in a form of a message box,
    wherein the information that belongs to the first preset category includes vehicle information and road information, the vehicle information at least includes one or more of safety reminders, fault reminders, speed information, acceleration information, steering operation, braking operation, the vehicle position, lane confirmation, navigation information, and driving logs, and the road information at least includes a status of a signal light and a gesture performed by a user conducting traffic,
    wherein the processor is further configured to determine a comparison between a first priority level of the signal light and a second priority level of the gesture performed by the user,
    wherein the processor is further configured to predict a traveling direction of the vehicle based on the vehicle information and highlight the road information associated with the traveling direction of the vehicle in the message box, and the highlighting refers to displaying the road information associated with the traveling direction on the display interface individually or performing one or more of the following operations on the road information associated with the traveling direction on the display interface: changing size, adjusting colour, and adjusting contrast, wherein when the navigation map is operated in a cruise mode, the prediction is made based on the vehicle position and the lane confirmation or based on the vehicle position and the steering operation and the driving logs, and one or more of the traffic signs, the traffic signals, and the road features associated with the traveling direction are highlighted on the display interface, and wherein the processor is further configured to convert the gesture into gesture information and display the gesture information on the display interface.

2. The navigation system of claim 1, wherein the processor is configured to update status, quantity, and content of the related information displayed in the message box in real time.

3. The navigation system of claim 1, wherein the navigation map comprises at least one of a two-dimensional plane map, a three-dimensional map, a real-world map, and a virtual reality map, and the vehicle position is displayed on the navigation map in a form of an icon or a virtual vehicle and the message box floats around the vehicle position.

4. The navigation system of claim 1, wherein the processor is further configured to selectively display the related information in the message box according to a priority of the related information and/or user customization.

5. The navigation system of claim 1, wherein when the navigation map is operated in a navigation mode, the prediction is made based on the vehicle position and the navigation information, and one or more of the traffic signs, the traffic signals, and the road features associated with the traveling direction are highlighted in the message box.

6. The navigation system of claim 1, wherein the related information displayed in the message box can be manually corrected by a driver.

7. The navigation system of claim 1, wherein the navigation system is a vehicle navigation system.

8. The navigation system of claim 1, wherein the processor is further configured to display, on the display interface, an indication of a status of a type of lane at an intersection and an amount of remaining time associated with the status.

9. The navigation system of claim 8, wherein the indication is an arrow.

10. A display method of a navigation map comprising:
displaying the navigation map and a position of a vehicle;
receiving vehicle-related information;
displaying the related information in real time following the vehicle position when the related information belongs to a first preset category, wherein displaying the related information following the vehicle position comprises displaying the related information in real time following the vehicle position in a form of a message box, wherein the information that belongs to the first preset category includes vehicle information and road information, the vehicle information at least includes one or more of safety reminders, fault reminders, speed information, acceleration information, steering operation, braking operation, the vehicle position, lane confirmation, navigation information, and driving logs, and the road information at least includes a status of a signal light and a gesture performed by a user conducting traffic;
determining a comparison between a first priority level of the signal light and a second priority level of the gesture performed by the user;
predicting a traveling direction of the vehicle based on the vehicle information and highlighting the road information associated with the traveling direction of the vehicle in the message box, and the highlighting refers to displaying the road information associated with the traveling direction on the display interface individually or performing one or more of the following operations on the road information associated with the traveling direction on the display interface: changing size or adjusting colour, and adjusting contrast, wherein when the navigation map is operated in a cruise mode, the prediction is made based on the vehicle position and the lane confirmation or based on the vehicle position and the steering operation and the driving logs, and one or more of the traffic signs, the traffic signals, and the road features associated with the traveling direction are highlighted on the display interface; and
displaying, on the display interface, an indication of a status of a type of lane at an intersection and an amount of remaining time associated with the status, wherein the indication is an arrow.

11. The display method of claim 10, wherein the information that belongs to the first preset category is customizable by a user.

12. The display method of claim 10, wherein the navigation map comprises at least one of a two-dimensional plane map, a three-dimensional map, a real-world map, and a virtual reality map, and the vehicle position is displayed on the navigation map in a form of an icon or a virtual vehicle and the message box floats around the vehicle position.

13. The display method of claim 10, further comprising selectively displaying the related information in the message box according to a priority of the related information and/or user customization.

14. The display method of claim 10, wherein when the navigation map is operated in a navigation mode, the prediction is made based on the vehicle position and the navigation information, and one or more of the traffic signs, the traffic signals, and the road features associated with the traveling direction are highlighted in the message box.

* * * * *